(12) United States Patent
Szabo et al.

(10) Patent No.: US 10,721,744 B2
(45) Date of Patent: Jul. 21, 2020

(54) RESOURCE REALLOCATION

(71) Applicant: Telefonaktiebolaget LM Ericsson (publ), Stockholm (SE)

(72) Inventors: Geza Szabo, Kecskemet (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 15/562,238

(22) PCT Filed: Apr. 23, 2015

(86) PCT No.: PCT/EP2015/058793
§ 371 (c)(1),
(2) Date: Sep. 27, 2017

(87) PCT Pub. No.: WO2016/169599
PCT Pub. Date: Oct. 27, 2016

(65) Prior Publication Data
US 2018/0063853 A1  Mar. 1, 2018

(51) Int. Cl.
*H04W 4/00* (2018.01)
*H04W 72/10* (2009.01)
(Continued)

(52) U.S. Cl.
CPC ............ *H04W 72/10* (2013.01); *H04L 67/32* (2013.01); *H04L 67/22* (2013.01); *H04W 4/18* (2013.01); *H04W 88/02* (2013.01)

(58) Field of Classification Search
None
See application file for complete search history.

(56) References Cited

U.S. PATENT DOCUMENTS 6,976,054 B1 * 12/2005 Lavian
8,797,865 B2    8/2014 Li
(Continued)

FOREIGN PATENT DOCUMENTS

EP    2693797 A2    2/2014

OTHER PUBLICATIONS

Almquist, P., "Type of Service in the Internet Protocol Suite", Network Working Group, RFC: 1349, Jul. 1-28, 1992.
(Continued)

*Primary Examiner* — Zewdu A Beyen
(74) *Attorney, Agent, or Firm* — Murphy, Bilak & Homiller, PLLC

(57) ABSTRACT

There is provided a network resource reallocation controller (160) arranged to control a reallocation of network resources by a network node (300) for delivery of content from at least one content provider apparatus (200) to applications (110, 120) on a User Equipment, UE (100). The network resource reallocation controller (160) comprises an information collection module (162) arranged to collect, for each of the applications (110, 120), respective information generated during use of the UE. The network resource reallocation controller (160) further comprises a resource reallocation request generator (164) arranged to generate network resource reallocation requests each comprising a priority value that is associated with a respective one of the applications (110, 120) and based on the information collected for the application, for use by the use by the network node (300) to reallocate the network resources for delivery of the content.

11 Claims, 6 Drawing Sheets

(51) Int. Cl.
*H04L 29/08* (2006.01)
*H04W 4/18* (2009.01)
*H04W 88/02* (2009.01)

(56) References Cited

U.S. PATENT DOCUMENTS

| | | |
|---|---|---|
| 2012/0023190 A1 | 1/2012 | Backholm et al. |
| 2013/0203433 A1 | 8/2013 | Luna et al. |
| 2013/0268984 A1* | 10/2013 | Salinger ............... H04L 47/806 |
| | | 725/109 |
| 2014/0056154 A1 | 2/2014 | Agarwal et al. |
| 2015/0103754 A1* | 4/2015 | Prokopenko .......... H04W 48/17 |
| | | 370/329 |

OTHER PUBLICATIONS

Heinanen, J. et al., "Assured Forwarding PHB Group", Network Working Group, RFC: 2597, Feb. 1-10, 1999.

* cited by examiner

RESOURCE REALLOCATION

TECHNICAL FIELD

The present invention generally relates to the field of telecommunication networks and, more specifically, to techniques for controlling a network node to reallocate network resources for delivery of content from one or more content providers to applications running on a User Equipment.

BACKGROUND

In 3GPP Long-Term Evolution (LTE) telecommunication systems, data packets are transported using the same protocols that are used on the Internet. However, the transport mechanisms used in LTE are more complex owing to two requirements that the Internet does not cater for, namely endpoint mobility and guaranteed quality of service (QoS). LTE fulfils these requirements by using so-called EPS bearers that transfer data bi-directionally on the correct route between the user equipment (UE) and the public data network (PDN) gateway or the serving gateway, and with the correct QoS. A bearer can be initiated by the network at the request of the UE, provided that the required network resources are available. Once the bearer has been established, the service can be provided to the UE. During the provision of the service, the network applies proper scheduling policies, guaranteed maximum loss rate, etc. to ensure the QoS of the bearer.

The network can offer QoS guarantees using an enhancement to the IP protocol called Differentiated Services (DiffServ). This is done by an ingress router at the entry point to a DiffServ network examining incoming packets, grouping them into classes ("Per Hop Behaviours", PHB), and labelling them using a six-bit so-called "Differentiated Services Code Point" (DSCP) field in the IP header. The DSCP field is examined by routers within the network and used in their algorithms for queueing, forwarding and dropping data packets. There are three types of PHB, namely best effort, expedited forwarding and assured forwarding. The PDN generates the DSCP field based on the QoS class indicator of the overlying bearer, using a predetermined mapping. DiffServ works by assigning a specific value from the network layer. The Linux implementation is the setsockopt () function, which sets up a value for a network socket in the UE. This value can be modified from user-space and can be used by the network to determine the required QoS relating to the data flow to the socket. QoS requirements can alternatively be signalled in the transport layer. In any case, the service requirements of a data flow between the network and a socket in the UE are specified for the whole lifetime of the service.

SUMMARY

The present inventors have recognised that the conventional approaches to allocating network resources to applications running on the UE outlined above result in static allocations which do not exploit the available resources as efficiently as they might, or in static allocations that exploit the available resources efficiently but whose inflexibility can lead to a decrease in the user's Quality of Experience (QoE) when the QoS requirements for the service data flows deviate during use of the applications from those originally stipulated. Moreover, the inventors have recognised that the conventional approaches to network resource allocation overlook UE-originated events that can provide valuable indications of changes to the QoS requirements for the flows that will likely be needed to maintain a good QoE for the user. These events are described by QoE-related information elements that may be provided at several different layers of the UE.

Having recognised these short-comings of conventional network resource allocation schemes, the present inventors have devised a system wherein measured QoE-related information elements are translated into resource reallocation requests for use by the network to reallocate its available resources. In embodiments of the present invention, these requests are defined dynamically, on demand, based on live, measured QoE-related information on the UE. A network node (e.g. an eNodeB in a Radio Access Network (RAN)), with which the UE communicates, can be made part of the value-chain, as the scheduling of user traffic is made QoE-aware.

More specifically, the present inventors have devised a system comprising a UE and at least one content provider apparatus that is arranged to deliver content to the UE via a network node of a network. The UE comprises a network resource reallocation controller arranged to control the network node to reallocate network resources for the delivery of content from the at least one content provider apparatus to applications on the UE. The network resource reallocation controller comprises an information collection module arranged to collect, for each of the applications, respective information generated during use of the UE. The network resource reallocation controller further comprises a resource reallocation request generator arranged to generate network resource reallocation requests each comprising a priority value that is associated with a respective one of the applications and based on the information collected for the application, for use by the network node to reallocate the network resources for delivery of the content. The network node comprises a receiver module arranged to receive the resource reallocation requests, and a network resource reallocation module arranged to reallocate the network resources for delivery of the content to the applications based on the priority values in the resource reallocation requests.

The present inventors have further devised a network resource reallocation controller arranged to control a reallocation of network resources by a network node for delivery of content from at least one content provider apparatus to applications on a UE. The network resource reallocation controller comprises an information collection module arranged to collect, for each of the applications, respective information generated during use of the UE. The network resource reallocation controller further comprises a resource reallocation request generator arranged to generate network resource reallocation requests each comprising a priority value that is associated with a respective one of the applications and based on the information collected for the application, for use by the network node to reallocate the network resources for delivery of the content.

The present inventors have further devised a network node arranged to reallocate network resources for delivery of content from at least one content provider apparatus to applications on a UE, based on resource reallocation requests received during execution of the applications on the UE. The network node comprises a receiver module arranged to receive the resource reallocation requests, each comprising a priority value associated with a respective one of the applications, and a network resource reallocation module arranged to reallocate the network resources for delivery of the content to the applications based on the priority values.

The present inventors have further devised a method of generating resource reallocation requests for controlling a network node to reallocate network resources for delivery of content from at least one content provider apparatus to applications on a UE. The method comprises a collection process of collecting, for each of the applications, respective information generated during use of the UE. The method further comprises a request generation process of generating network resource reallocation requests each comprising a priority value that is associated with a respective one of the applications and based on the information collected for the application, for use by the network node to reallocate the network resources for delivery of the content.

The present inventors have further devised a method of reallocating network resources by a network node for delivery of content from at least one content provider apparatus to applications on a UE, based on resource reallocation requests received during execution of the applications on the UE. The method comprises a receiving process of receiving the resource reallocation requests, each comprising a priority value associated with a respective one of the applications, and a resource reallocation process of reallocating the network resources for delivery of the content to the applications based on the priority values.

The present inventors have further devised a computer program product, comprising a signal or a non-transitory computer-readable storage medium carrying computer program instructions which, when executed by a processor, cause the processor to perform at least one of the methods set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Figure 1:
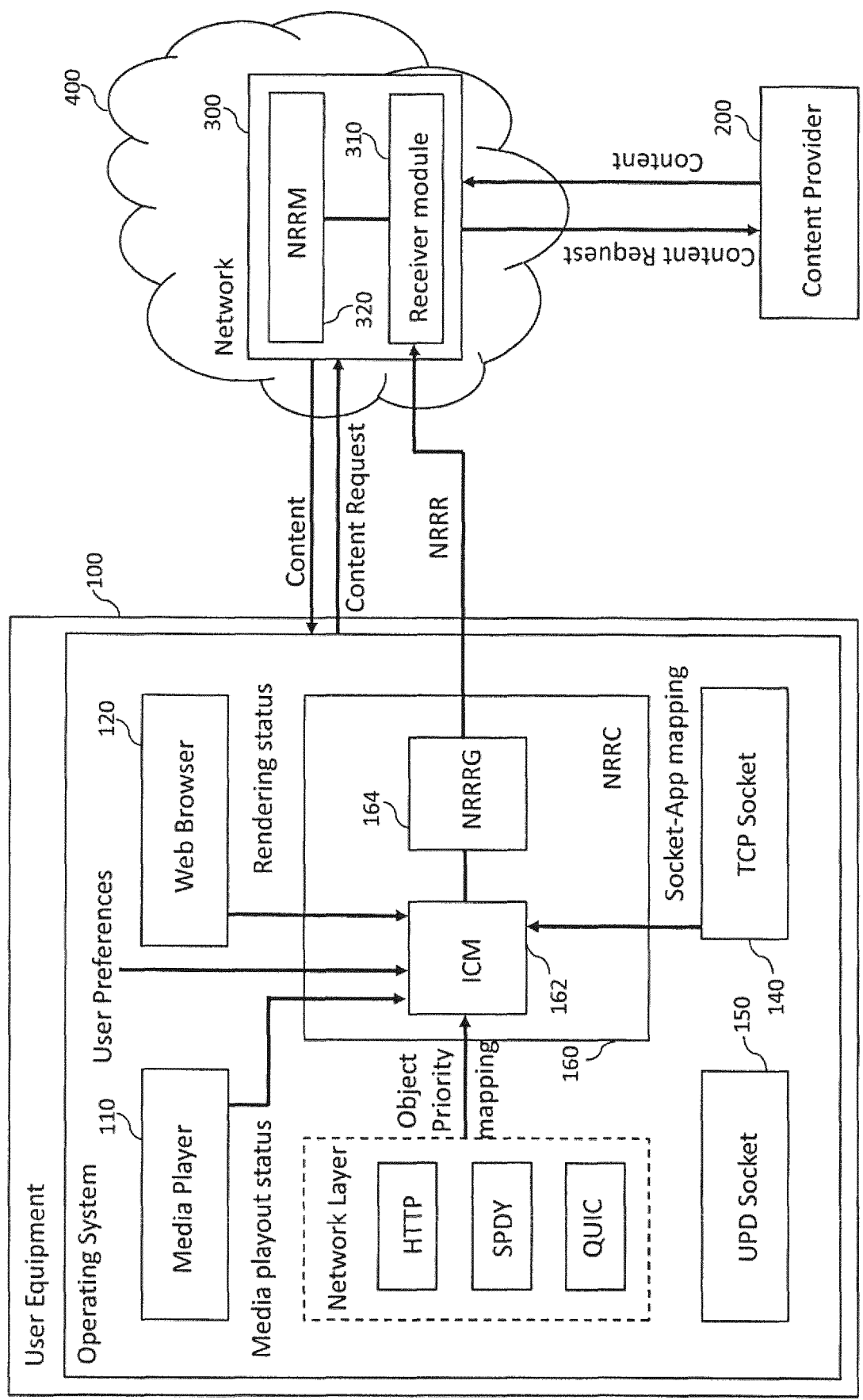
FIG. 1 is schematic illustration of a telecommunication system according to an embodiment of the present invention.

FIG. 1 provides a schematic illustration of a system according to an embodiment of the present invention, comprising a UE 100 that is arranged to communicate with least one content provider apparatus (typically a network server) 200 via a network node 300 that forms part of a network 400. The UE 100 may, as in the present embodiment, be provided in the form of a tablet PC, although many other well-known hardware implementations of the UE (e.g. smartphone, laptop PC etc.) are also possible.

Figure 2:
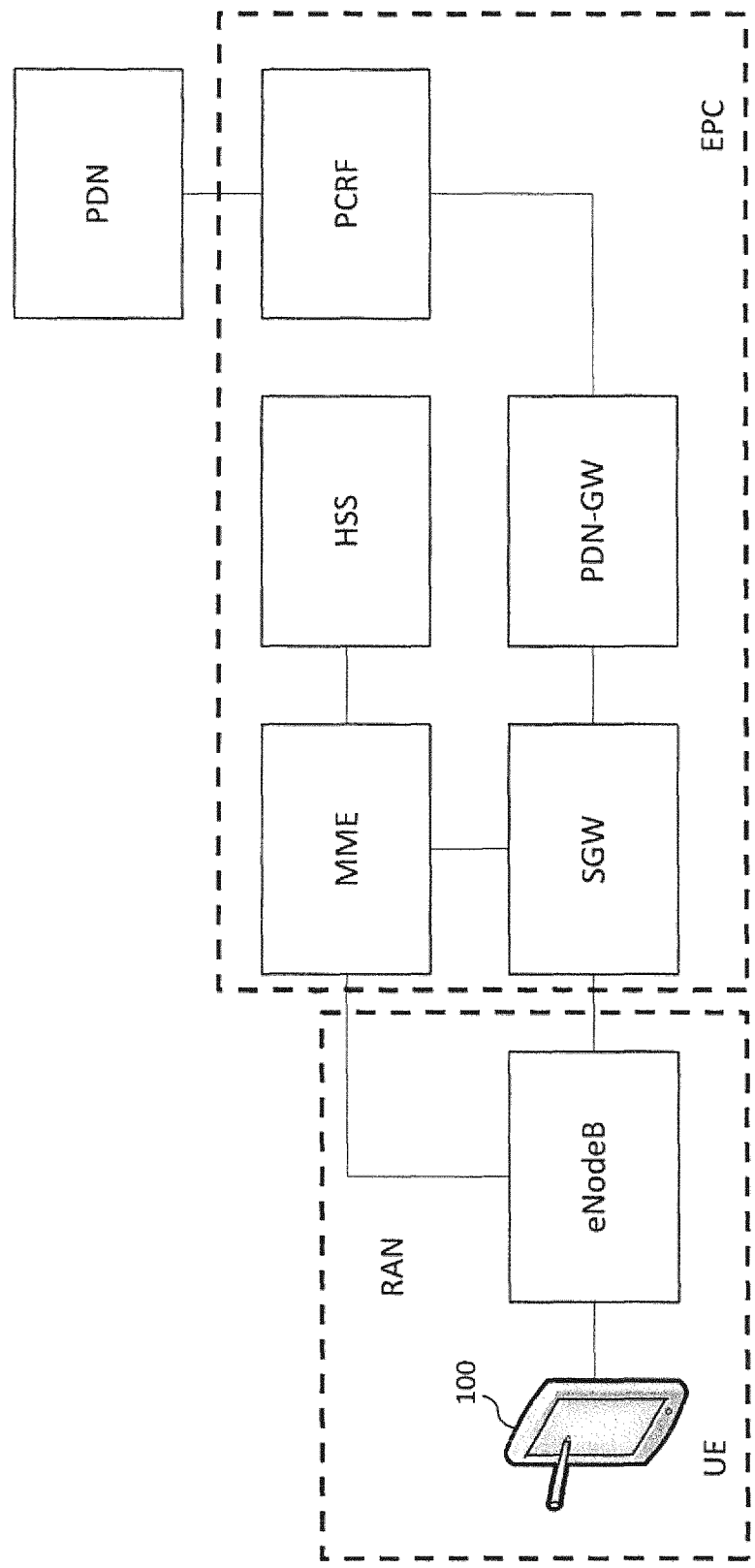
FIG. 2 is a schematic illustration of components of the network in the embodiment of FIG. 1, which takes the form of a Systems Architecture Evolution (SAE) network employing 3GPP access technology.

The network 400 may take one of many different forms. The network 400 of the present embodiment is provided, by way of example, in the form of a Systems Architecture Evolution (SAE) network employing 3GPP access technology, key components of which are illustrated in FIG. 2. As shown in FIG. 2, the UE is arranged to connect to a Radio Access Network (RAN) comprising eNodeBs, one of which is illustrated in FIG. 2. The eNodeB is connected to the Evolved Packet Core (EPC) comprising a Mobility Management Entity (MME), a Serving Gateway (SGW), a Home Subscriber Server (HSS), a Public Data Network Gateway (PDN-GW), and a Policy and Charging Rules Function (PCRF). The PCRF is connected to a Public Data Network (PDN) such as the Internet, to which the content provider apparatus (not shown in FIG. 2) is also connected. The details of the SAE are well-known to those skilled in the art such that further explanation thereof is not necessary. Any of the elements in the network (whether or not they are shown in FIG. 2) that take part in the scheduling of network traffic may be configured with functionality herein described to form an embodiment of the present invention. However, by way of example, the network node 300 takes the form of an eNodeB in the present embodiment, which provides the traffic bottleneck in the network 400.

The UE 100 is configured to run a plurality of applications (hereinafter abbreviated to "apps") with the support of an operating system 130 which may, as in the present embodiment, be provided in the exemplary form of an Android™ operating system. Another kind of operating system could, however, be used instead of the Android™ operating system. By way of example, two apps are illustrated in FIG. 1, namely a media player app 110 and a web browser app 120, although more than two apps of other kinds may be installed on the UE 100. The apps 110, 120 are configured to communicate with the content provider apparatus 200 by sending messages including requests for delivery of content (e.g. music and/or video files in the case of the media player app 110, and web page content in the case of the web browser app 120), and receiving the requested content from the content provider apparatus 200 via the network node 300 in the network 400. This traffic is routed through the network 400, via the network node 300, to/from the UE 100. In the UE 100, a respective set of network sockets is selected by each app using a socket API normally provided by the operating system, so as to provide a set of designated end-points for the traffic flows carrying the content required for the app. The transport layer protocol and the associated type of network sockets used by an app will depend on the requirements of the app in terms of latency, error checking and correction etc. The apps may, as in the present embodiment, be assigned TCP sockets 140. Alternatively, the apps may be assigned UDP sockets 150. As a further alternative, one or more of the apps may be assigned TCP sockets 140 while one or more other apps may be assigned UDP sockets 150. The delivery of content to the apps 110, 120 may, as in the present embodiment, rely on the HTTP protocol or alternatively on another protocol such as SPDY or QUIC. These examples of application layer (HTTP and SPDY) and transport layer (QUIC) communication protocols can provide network layer information about object priorities requested from the content provider servers 200. The network layer priority information for sending to content providers is an existing feature of the HTTP2 and QUIC protocols. The terms "application layer", "transport layer" and "network layer" used herein are to be understood within the context of the Open Systems Interconnection (OSI) model (ISO/IEC 7498-1).

As an example, an app in the form of a web browser may implement various heuristics for prioritising the loading of resources, as the loading of some resources (such as images) may be less performance-critical than the loading of other resources (e.g. external style sheets). By implementing basic priorities, the browser can achieve substantially better performance loading web pages. Because complex applications heavily rely on resource loading by way of XmlHttpRequest, a mechanism may be provided that allows an application to hint to a browser how to load a XmlHttpRequest. When a new XMLHttpRequest object is created, it may convey a priority. A browser which schedules resource fetches may optionally use this priority to determine the order in which resources are to be fetched. Applications may alter the priority by calling the setPriority( ) method on the XMLHttpRequest object. The priority set on the object at the time the application calls the XMLHttpRequest.send( ) method determines the priority which the browser should use when fetching this resource. Calling setPriority( ) after the send( ) method will have no effect on the priority of the resource load.

Further aspects of the configuration of the UE 100 and of the network node 300 that are helpful for understanding the present invention are described in detail below, while other aspects, which will be familiar to those skilled in the art, will not be described for the sake of clarity.

As shown schematically in FIG. 1, the UE 100 comprises a network resource reallocation controller (NRRC) 160, which is arranged to control the network node 300 to reallocate its available network resources for the delivery of content from the content provider apparatus 200 to the apps 110, 120 on the UE 100.

The NRRC 160 comprises an information collection module (ICM) 162 arranged to collect, for each of the apps 110, 120, respective information that is generated during use of the UE. The collected information may be indicative of events which occur during use of the UE and which would require a reallocation of network resources in order to maintain or improve the user's quality of experience (QoE). For example, the event might be the bringing of the app (e.g. web browser 120) from the background of the UE's display to the foreground, meaning that the user's level of interaction with the app has increased so that faster download of web page content is required in order to avoid frustrating delays in waiting for content to download and in this way enhance the user's QoE. The occurrence of such an event could be collected by querying the UE's operating system. Other examples of such events are described below.

The NRRC 160 also includes a network resource reallocation request generator (NRRRG) 164, which is configured to generate network resource reallocation requests (NRRR) each comprising a priority value associated with a respective one of the apps 110, 120 and based on the information collected by the information collection module 162. As will be described in the following, the priority values are used by the network node 300 to reallocate resources for effective delivery of the content.

As also shown in FIG. 1, the network node 300 comprises a receiver module 310 arranged to receive the resource reallocation requests, and a network resource reallocation module (NRRM) 320 arranged to reallocate the network resources for delivery of the content to the apps 110, 120 based on the priority values in the received resource reallocation requests. Further details of an exemplary implementation of these components of the network node and of their functionality are provided below.

Figure 3:
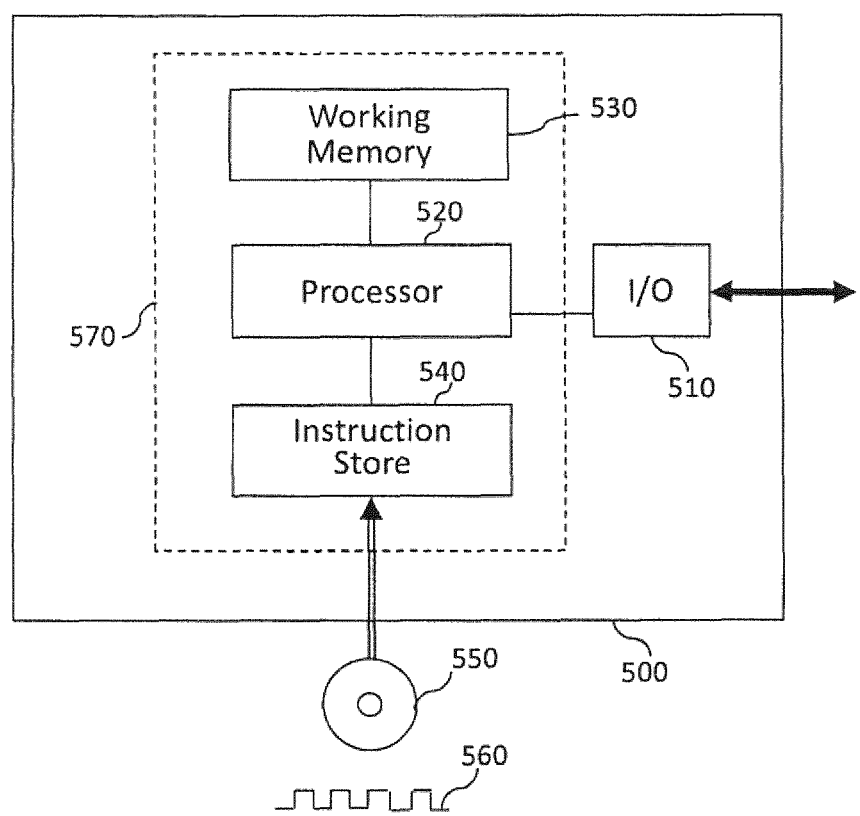
FIG. 3 is a schematic illustration of an example of programmable signal processing apparatus, which may be used to implement one or more of the network resource reallocation controller (NRRC) 160 and the network node 300 shown in FIG. 1.

FIG. 3 shows an example of programmable signal processing apparatus 300 that may be programmed to provide the functionality of the NRRC 160 (as well as one or more other components of the UE) and of the receiver module 310 and the network resource reallocation module 320 of the network node 300 described herein. The signal processing apparatus shown in FIG. 3 comprises an input/output (I/O) section 510 that functions to receive data to be processed and transmit the processing results. The signal processing apparatus further comprises a processor 520, a working memory 530 and an instruction store 540 for storing computer-readable instructions which, when executed by the processor 520, cause the processor 520 to perform the processing operations hereinafter described to generate network resource reallocation requests or (as the case may be) reallocate network resources for delivery of the content from the content provider apparatus 200 to the apps on the UE 100. The instruction store 540 may comprise a RAM or similar type of memory, and the computer-readable instructions can be input thereto from a computer program product, for example a computer-readable storage medium 550 such as a CD-ROM, etc. or a computer-readable signal 560 carrying the computer-readable instructions.

In the present embodiment, the combination 570 of the hardware components shown in FIG. 3, comprising the processor 520, the working memory 530 and the instruction store 540, is configured to implement the functionality of the NRRC 160 shown in FIG. 1. A programmable signal processing apparatus of the kind shown in FIG. 3 (more particularly, the combination 570) may similarly be configured to provide the functionality of the receiver module 310 and the network resource reallocation module 320 of the network node 300.

Figure 4:
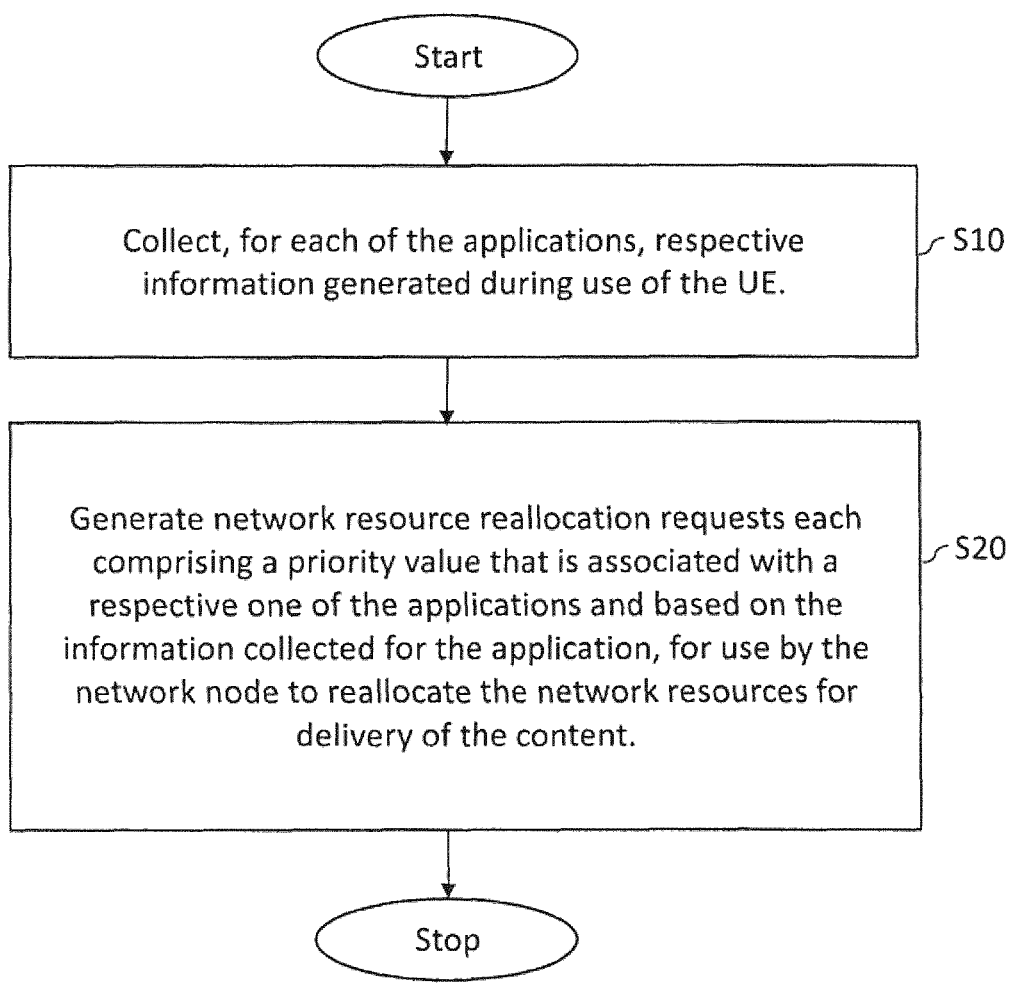
FIG. 4 is a flow diagram illustrating processes performed by the NRRC of the embodiment to generate network resource reallocation requests for the network node.

The processes performed by the NRRC 160 of the present embodiment to generate resource reallocation requests for controlling the network node 300 to reallocate network resources for delivery of content from the content provider apparatus 200 to the apps 110, 120 will now be described with reference to FIG. 4.

In step S10, the information collection module 162 of the NRRC 160 performs a collection process of collecting, for each of the apps 110, 120, respective information generated during use of the UE 100.

The information collected for each of the apps 110, 120 in step S10 may, in general, comprise an indication of a priority assigned to the app relative to the other apps by the user of the UE 100. For example, the NRRC 160 may, either in response to a user input or at a time determined by the NRRC 160 (e.g. at regular intervals or upon being launched), be configured to cause the UE 100 to display a user interface that allows the user to prioritise the apps in terms of one or both of a network bandwidth priority and a network delay priority. Additionally or alternatively, the apps may be prioritised in terms of accepted data error rate.

Figure 5:
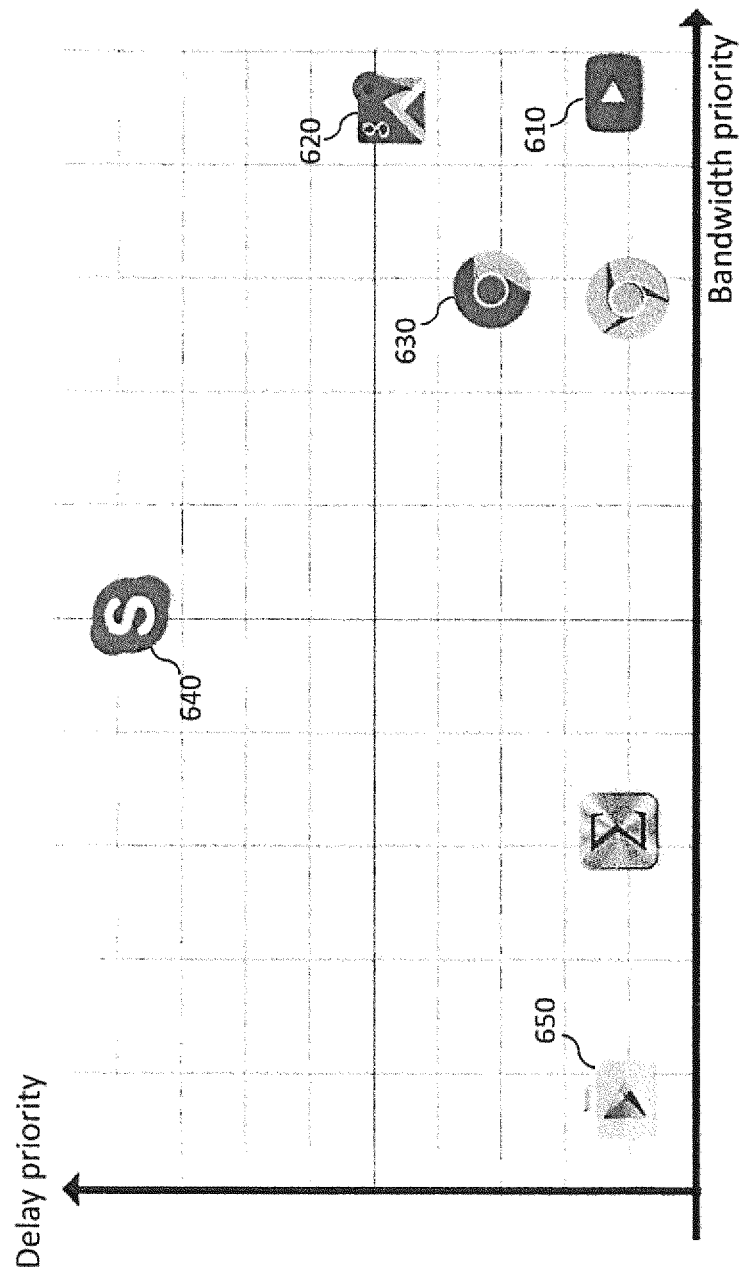
FIG. 5 shows an example of a user interface on the UE that allows the user to assign priorities to apps on the UE.

An example of such a user interface is illustrated in FIG. 5, where the user can use his/her finger to "drag" icons representing a YouTube™ app 610, Google Maps™ app 620, Google Chrome™ app 630, Skype™ 640 and Google Play™ 650 (among others) along one or both of the axes shown that represent delay priority (y-axis) and bandwidth priority (x-axis). The communication bandwidth priority of an app provides an indication of how much communication bandwidth is to be allocated for the app by the network node 300 relative to one or more other apps that are concurrently running on the UE 100. Thus, the ordering of the apps by the user in terms of network bandwidth priority is to be reflected in the relative amounts of network bandwidth (in other words, data throughput capacity) that are subsequently allocated for carrying data to the apps. For instance, in the example of FIG. 5, the user has assigned a higher network bandwidth priority to the YouTube™ app 610 than to Google Play™ app 650, such that greater bandwidth is to be assigned to the former app. The network bandwidth priorities set by the user may, but need not, provide a quantitative indication of the relative bandwidth assignments. For example, although the priority of the YouTube™ app 610 in FIG. 5 is about twice that of the Skype™ app 640, the bandwidth assigned to the YouTube™ app 610 may, but need not, be, twice that assigned to the Skype™ app 640.

Similarly, the communication delay priority provides an indication of a communication transfer delay specified (or a maximum transfer delay permitted) for the app relative to the communication transfer delays for one or more other concurrently running apps. Thus, apps that are preferably assigned a high communication delay priority, such as Voice over IP (VoIP) applications like Skype™ 640, require a smaller delay for satisfactory operation than some other apps like the web browser 630, which do not require such fast packet transmission. As with the network bandwidth priority, the ordering of the apps by the user in terms of network delay priority is to be reflected in the relative latencies of the data flows to the apps. For instance, in the example of FIG. 5, the user has assigned a higher network delay priority to the Skype™ app 640 than to Google Play™ app 650, such that smaller packet transmission delays are to be achieved the former app. The network delay priorities set by the user may, but need not, provide a quantitative indication of the relative packet transmission delays in the data flows to the apps. For example, although the priority of the Skype™ app 640 in FIG. 5 is about twice that of the Google Maps™ app 620, the packet transmission delay for the Google Maps™ app 620 may, but need not be, twice that for the Skype™ app 640.

It will be appreciated that the user interface illustrated in FIG. 5 is given by way of example only, and that the interface may take one of many other different forms, allowing the user to set the network bandwidth priority and the network delay priority independently of one another (or such that a predetermined relationship between these priorities is maintained), or to set either one of the network bandwidth priority and the network delay priority in accordance with his/her requirements. In any event, the indication of a priority assigned to one app relative to the other apps by the user of the UE 100 can be used to update the allocation of network resources by the network node 300 and thus improve the QoE for the user while using the apps 110, 120.

The information collected for each of the apps 110, 120 in step S10 may, in general, additionally or alternatively comprise an indication that the app 110, 120 has switched from displaying in one of a foreground and a background of a display of the UE 100 to the other of the foreground and the background. For example, the information collection module 162 may monitor the operational state of the UE to identify when an app has switched from displaying in the background to displaying in the foreground. The information collection module 162 may collect this indication by querying the UE's operating system (e.g. at regular time intervals) to identify the app that is the foreground (in other words, the app that is currently "in focus"), which would mean that the identified app is currently being used and should therefore be prioritised as foreground processes have the highest impact on the perceived QoE of the user.

The information collected for each of the apps 110, 120 in step S10 may, in general, additionally or alternatively comprise app-level information that is indicative of at least one of the performance of the app 110, 120 and an interaction of the user with the app 110, 120. This kind of information may provide an indication of whether the delivery of content to the app is likely to keep up with the demands of the user and thus lead to a good QoE. For example, if the app-level information for the media player app 110 indicates that the buffering time is relatively long and/or that the user is pressing a Fast Forward button in the media player's user interface (or has skipped to a portion of the media file that has yet to be buffered), then this information would indicate that more network resources need to be allocated to the media player app 110 in order to avoid degrading the QoE of the user. It will be appreciated that other Key Performance Indicators (KPIs) may apply for other kinds of app (e.g. in the case of the web browser app 120, Web KPIs) and that other kinds of interaction of the user with the app are possible (e.g. clicking in the web browser).

The information collected for each of the apps 110, 120 in step S10 may, in general, additionally or alternatively comprise network layer information indicating a priority of an object requested from the content provider apparatus 200 for the application. Some network protocols (e.g. QUIC and SPDY) provide information about object priorities requested from content providers. The priority information going to the content provider is an existing feature in HTTP2 and QUIC. As the communication uses an encrypted tunnel, conventional network nodes on the communication path (which may be configured to apply Deep Packet Inspection (DPI) to introduce traffic differentiation) cannot use this information. Thus, it is impossible for a conventional node to support any kind of QoE enhancement for such encrypted traffic. However, in the present embodiment, this information can be extracted from the network layer and transferred to the network node 300 via the object priority mapping illustrated in FIG. 1.

Some operators apply Deep Packet Inspection (DPI) middle boxes to introduce traffic differentiation in the network for the internet traffic. However, end-to-end encryption (e.g. HTTPS, SPDY, QUIC) makes it impossible to support any kind of QoE enhancement in a middle box for such encrypted traffic.

In general, the information collection module 162 may collect any one, or a combination of any two or more, of the above-described difference kinds of information that may be generated during use of the UE 100. The nature of the collected information will depend on the how the user interacts with the apps and the NRRC 160 during use of the UE 100. In the present embodiment, all four of the above-described kinds of information are collected in step S10, as and when they become available for collection by the information collection module 162 during use of the UE 100. The information collection module 162 of the present embodiment can thus collect the information from different layers, including the network layer and the application layer.

Information from apps 110, 120 of the kind described above may be collected by the information collection module 162 in many different ways. For example, there are several types of inter-app communication methods in the Android™ operating system with specific pros and cons. For example, the communication may be intent-based; in this case, the apps 110, 120 in the UE 100 may send broadcast messages to the whole system, which can be received and processed by the information collection module 162. This requires no cooperation between the apps 110, 120 and the information collection module 162. The inter-app communication method alternatively be file-based; in this case, the apps may write data to a shared memory (e.g. an SD card in the UE 100), which the information collection module 162 can read. This method would require no modification of the apps (assuming they are configured to write logs to the shared memory in the first place). In this example, the information collection module 162 can read the log with a slight delay, due to IO buffering, IO locks, etc. As a yet further alternative, the inter-app communication method may rely on sockets; in this case, the apps 110, 120 may connect to the inter-app communication method via a common TCP/UDP socket and send data on it. This is an efficient communication of any kind of data but requires both the apps 110, 120 and the inter-app communication method to be prepared for the cooperation. It will be appreciated that the apps 110, 120 in the UE 100 may use different ones of these inter-app communication methods or other inter-app communication method known to those skilled in the art.

Referring again to FIG. 4, in step S20, the NRRRG 164 performs a request generation process of generating network resource reallocation requests each comprising a priority value that is associated with a respective one of the apps 110, 120 and based on the information collected for the app, for use by the network node 300 to reallocate the network resources for delivery of the content.

More particularly, where the information collection module 162 collects, for at least one of the apps 110, 120, an indication of the priority assigned to the respective app(s), the NRRRG 164 generates in step S20, based on the collected indication(s), a respective first partial priority value for each of the at least one app for calculating the priority value associated with the respective app.

Furthermore, where the information collection module 162 collects, for either of the apps 110, 120, an indication that the app has switched from displaying in the background of the UE's display to displaying in the foreground, the NRRRG 164 generates in step S20, based on the collected indication, a second partial priority value for calculating the priority value associated with the app that has transitioned to being displayed in the foreground.

Furthermore, where the information collection module 162 collects, for each of one or more of the apps 110, 120, the above-described data that is indicative of the performance of the app and/or the interaction of the user with the app, the NRRRG 164 generates, based on the collected data, a third partial priority value for calculating the priority value associated with the respective app. Furthermore, where the information collection module 162 collects the network layer information for each of one or more of the apps 110, 120, the NRRRG 164 generates, based on the collected network layer information, a fourth partial priority value for calculating the priority value associated with the respective app.

Having generated one or more partial priority values for e.g. app 110 as described above, the NRRRG 164 calculates the priority value for the network resource reallocation request associated with app 110 by summing the partial priority values generated thereby for this app. The priority value for app 120 can be calculated in a similar way.

In more detail, every new socket that the NRRRG 164 becomes aware of may, as in the present embodiment, be assigned a default medium priority value. This may be advantageous as assigning too low a priority may not allow opening of the RTT window of the socket, while a priority that is too high might cause the allocation of a lot of resources for sockets of low-priority background processes. After identification of the app that corresponds to the socket (using the socket-app mapping shown in FIG. 1), the first partial priority value is collected by the NRRRG 164, for example by looking up the priority value that has been set by the user (e.g. via a user interface of the kind described above with reference to FIG. 5) and stored in the UE 100. This partial priority value is added to the default priority value by the NRRRG 164.

The identification of the app of the socket also makes it possible to query the UE's operating system to determine whether the app is a foreground process. If the app is a foreground process, the NRRRG 164 generates the second partial priority value and adds it to default priority value along with the first partial priority value (if any). Application-level originated events from the user that have a high impact on the QoE should also increase socket priority. Accordingly, collected data that is indicative of the performance of the app and/or the interaction of the user with the app can be used by the NRRG 164 to generate the third partial priority value for addition to the sum. Furthermore, if the protocols using the socket apply priority information on the transferred objects, the NRRRG 164 generates the fourth partial priority value and also adds that to the sum. The order in which the partial priorities are added to the default value is not important and can vary from one embodiment to another.

Although the collection of the information by the information collection module 162 and the generation of each of the partial priority values for each socket is optional, the more information is collected, the more accurate the requested priority will be. Missing some of the information will result in a smaller sum, which will be manifested as a lower priority on the RAN side.

The network resource reallocation request generated in step S20 may, as in the present embodiment, also include a network socket identifier that identifies the network socket of the UE 100 that is being used by the app, a priority value lifetime indicator that indicates how long the priority value in the network resource reallocation request is to apply for the network socket identified by the network socket identifier, and a content amount indicator that indicates a maximum amount of content that can be transmitted to the network socket identified by the network socket identifier using network resources that have been allocated on the basis of the priority value in the resource reallocation request before the priority value ceases to apply for the identified network socket. Thus, in the present embodiment, a network resources reallocation request may be expressed in the following form: [5-tuple A, priority B, priority value lifetime C, content amount D], which is to be interpreted as a request to make socket A have the priority B for period C or until the number of bytes indicated by content amount D has been transmitted. The same priority may be requested for all the sockets of a specific app. The NRRRG 162 may, as in the present embodiment, cancel a request that has been sent to the network node 300 at any time with a cancel request message.

Figure 6:
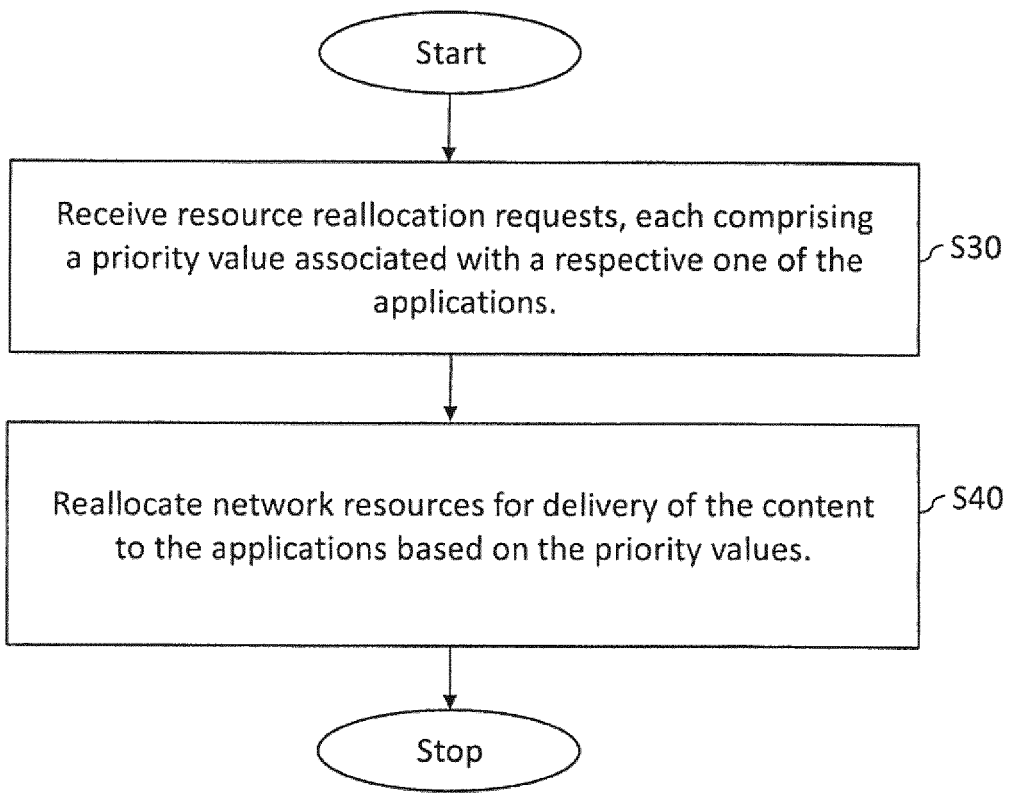
FIG. 6 is a flow diagram illustrating processes performed by the network node of the embodiment to reallocate network resources for provision of content to the apps in the UE from the content provider apparatus shown in FIG. 1.

The processes performed by the network node 300 of the present embodiment to reallocate network resources for delivery of content from the content provider apparatus 200 to the apps 110, 120, on the basis of the network resource reallocation requests received from the NRRRG 164, will now be described with reference to FIG. 6.

In step S30, the receiver module 310 of the network node 300 performs a receiving process of receiving the network resource reallocation requests from the NRRRG 164 of the UE 100, which have been generated by the NRRRG 164 in the manner described above.

In step S40, the network resource reallocation module (NRRM) 320 performs a process of reallocating the network resources for delivery of the content to the apps 110, 120 based on the priority values in the received requests. More specifically, for each received resource reallocation request, the NRRM 320 reallocates the network resources for delivery of the content to the network socket identified by the network socket identifier using the priority value in the resource reallocation request.

During the receiving process in step S30, the receiver module 310 may receive a plurality of resource reallocation requests in a predetermined time interval, where the requests comprise respective priority values but are all associated with the same app. Thus, multiple requests received during this time interval may request different priorities for app 110, for example. Under these circumstances, the NRRM 320 may, as in the present embodiment, reallocate the network resources for delivery of the content to the app using the highest priority value in the resource reallocation requests received during the predetermined time interval. The NRRM 320 may, however, alternatively reallocate the network resources for delivery of the content to the app using an average (e.g. mean) of the priority values in the resource reallocation requests received during the predetermined time interval.

The NRRM 320 uses the priority value in the resource reallocation request to reallocate the available network resources for the length of time indicated by the priority value lifetime indicator, or until the amount of content transmitted reaches the maximum amount indicated by the content amount indicator, if this occurs sooner.

How the NRRM 320 reallocates the available network resources may depend on the nature of the resource reallocation requests. For example, where the received resource reallocation requests comprise respective priority values associated with apps 110, 120 each indicating a communication bandwidth priority set for the respective app, the NRRM 320 may distribute the communication bandwidth available at the network node 300 so as to deliver the content to the apps in accordance with the specified communication bandwidth priorities. Additionally or alternatively, where the received resource reallocation requests comprise respective priority values associated with apps 110, 120 each indicating a communication delay priority set for the respective app, the NRRM 320 may distribute the communication bandwidth available at the network node 300 so as to deliver the content to the apps in accordance with the specified communication delay priorities.

The priority value may, as in the present embodiment, conform with current ToS fields (i.e. 1 byte in length) and should preferable not contain any private information of the user. The following function may be used to put the received weight into the 0-255 byte range. As some bits in the DSCP is reserved, only the upper 7 bits can be used.

```
public static byte getDscpFromComponents(double weight){
    byte dscp;
    weight = (short) Math.max(-28, Math.min(weight, 27));
    dscp = (byte) (16 + 16 * weight/28);
    return dscp;
}
public static void updateDspcForSocket(int port, int protocol){
    double sumWeight = 0;
    String key = generateKey(port, protocol);
    String appName = socketToApp.get(key);
    if(appName!=null && appBaseWeights.get(appName)!=null){
// Every new socket receives a default middle priority value.
        // Base weight
        sumWeight = appBaseWeights.get(appName);
// After the identification of the corresponding app of the
socket, the user specified priorities are mapped to the socket.
        // App relative weight
        if(appRelativeWeight.get(appName)!=null){
            sumWeight = sumWeight + appRelativeWeight.get(appName);
        }
        // Socket relative weight -- If the protocols
using the socket apply priority information on the transferred
objects then the protocol priorities are added to the current
socket priority.
        if(socketRelativeWeight.get(key)!=null){
            sumWeight = sumWeight + socketRelativeWeight.get(key);
        }
        byte dscp = getDscpFromComponents(sumWeight);
        DSCPSender.sendUpdate(protocol, port, dscp);
    }
}
```

The identification of the app of the socket makes it possible to query the OS to determine whether it is a foreground process. If it is a foreground process, the priority of the socket is increased further.

```
public static void updateSocketInfoFromOS(List<AppSocket> socketList,
ActivityManager manager) {
    // Determine front app
    List<RunningTaskInfo> runningTasks = manager.getRunningTasks(1);
        if(runningTasks.size( ) > 0) {
            frontAppName = null;
            frontBaseWeight = 0;
            frontRelativeWeight = 0;
            frontAppName = runningTasks.get(0).topActivity.getPackageName( );
            Double weight = appBaseWeights.get(frontAppName);
            if(weight==null){
                frontBaseWeight = otherBaseWeight;
            }else{
                frontBaseWeight = weight;
                weight = appRelativeWeight.get(frontAppName);
                if(weight!=null){
                    frontRelativeWeight = weight;
                }
            }
            frontDscp = Info4DSCP.getDscpFromComponents(frontBaseWeight +
frontRelativeWeight);
        }
}
```

In the above embodiment, no privacy-sensitive information is leaked from the UE. Furthermore, implementation of the concepts described above requires no root privileges on the UE.

[Modifications and Variations]

It will be appreciated that many modifications and variations of the above-described embodiments are possible, besides the modifications and variations already mentioned above.

For example, although the NRRC 160 is a stand-alone app on the UE 100 in the above-described embodiment, an existing app could instead be adapted to provide the described functionality of this module, gathering data generated by/for that app as well as one or more other apps on the UE 100. Furthermore, the functions of the information collection module 162 and the NRRRG 164 of the NRRC 160 could respectively be provided by two different applications on the UE 100 that are communicatively coupled to exchange the necessary data with one another.

The invention claimed is:

1. A content delivery system comprising:
a User Equipment, UE, comprising:
   a UE processor; and
   a UE instruction store storing first computer-readable instructions that, when executed by the UE processor, configure the UE to control a network node to reallocate network resources for the delivery of content from at least one content provider apparatus to applications on the UE, including:
      collecting, for respective applications on the UE, respective information generated during use of the UE;
      generating resource reallocation requests, each resource allocation request comprising a network socket identifier that identifies a network socket of the UE that has been assigned for use by the respective application, each resource allocation request also comprising a priority value that is associated with a respective one of the applications and based on the information collected for the application, wherein at least one of the resource reallocation requests includes one or more of the following:
         a priority value lifetime indicator that indicates how long the priority value in the resource reallocation request is to apply for the network socket of the UE identified by the network socket identifier, and
         a content amount indicator that indicates a maximum amount of content, transmitted to the network socket, for which the priority value is to apply; and
a network node communicatively coupled to the UE, the network node comprising:
   a network node processor; and
   a network node instruction store storing second computer-readable instructions which, when executed by the network node processor, configure the network node to:
      receive the resource reallocation requests, each comprising the priority value and the network socket identifier associated with a respective one of the applications; and
      reallocate the network resources for delivery of the content to the respective applications based on the respective priority values and to the network sockets identified by the respective network socket identifiers in the resource reallocation requests, wherein:
         for the resource allocation requests including the priority value lifetime indicator, the reallocation based on the priority value is performed only for the length of time indicated by the priority value lifetime indicator; and
         for the resource allocation requests including the content amount indicator, the reallocation based on the priority value is performed only until the amount of content transmitted reaches the maximum amount indicated by the content amount indicator.

2. The system according to claim 1, wherein:
each priority value indicates a communication bandwidth priority set for the respective application, the communication bandwidth priority providing an indication of a communication bandwidth required for the application relative to the communication bandwidths required for one or more other applications; and
execution of the second computer-readable instructions configures the network node to reallocate the network resources based on distributing communication bandwidth available at the network node so as to deliver the content to the applications in accordance with the respective communication bandwidth priorities.

3. The system according to claim 1, wherein:
each priority value indicates a communication delay priority set for the respective application, the communication delay priority providing an indication of a communication delay required for the application relative to the communication delays required for one or more of the other applications; and
execution of the second computer-readable instructions configures the network node to reallocate the network resources so as to deliver the content to the applications in accordance with the respective communication delay priorities.

4. A network node arranged to reallocate network resources for delivery of content from at least one content provider apparatus to applications on a User Equipment, UE, based on resource reallocation requests received from the UE, the network node comprising:
a processor; and
an instruction store storing computer-readable instructions which, when executed by the processor, configure the network node to:
   receive the resource reallocation requests, each resource allocation request comprising a network socket identifier that identifies a network socket of the UE that has been assigned for use by the respective application, each resource allocation request also comprising a priority value associated with a respective one of the applications, wherein at least one of the resource reallocation requests includes one or more of the following:
      a priority value lifetime indicator that indicates how long the priority value in the resource reallocation request is to apply for a network socket that has been assigned to the respective application, and
      a content amount indicator that indicates a maximum amount of content, transmitted to the network socket, for which the priority value is to apply; and
   reallocate the network resources for delivery of the content to the applications based on the respective priority values and to the network sockets identified by the respective network socket identifiers in the resource reallocation requests, wherein:
  for the resource allocation requests including the priority value lifetime indicator, the reallocation based on the priority value is performed only for the length of time indicated by the priority value lifetime indicator; and
  for the resource allocation requests including the content amount indicator, the reallocation based on the priority value is performed only until the amount of content transmitted reaches the maximum amount indicated by the content amount indicator.

5. The network node of claim 4, wherein:
each priority value indicates a communication bandwidth priority set for the respective application, the communication bandwidth priority providing an indication of a communication bandwidth required for the application relative to the communication bandwidths required for one or more other applications; and
execution of the computer-readable instructions configures the network node to reallocate the network resources based on distributing communication bandwidth available at the network node so as to deliver the content to the applications in accordance with the respective communication bandwidth priorities.

6. The network node of claim 4, wherein:
each priority value indicates a communication delay priority set for the respective application, the communication delay priority providing an indication of a communication delay required for the application relative to the communication delays required for one or more other applications; and
execution of the computer-readable instructions configures the network node to reallocate the network resources so as to deliver the content to the applications in accordance with the respective communication delay priorities.

7. The network node of claim 4, wherein execution of the computer-readable instructions further configures the network node to:
  receive a plurality of the resource reallocation requests in a predetermined time interval, each comprising a respective priority value that is associated with one of the applications; and
  reallocate the network resources for delivery of the content to the application using one of:
    the highest priority value in the resource reallocation requests received during the predetermined time interval; and
    an average of the priority values in the resource reallocation requests received during the predetermined time interval.

8. A method of reallocating network resources by a network node for delivery of content from at least one content provider apparatus to applications on a User Equipment, UE, based on resource reallocation requests received during execution of the applications on the UE, the method comprising:
  receiving the resource reallocation requests, each resource allocation request comprising a network socket identifier that identifies a network socket of the UE that has been assigned for use by the respective application, each resource allocation request also comprising a priority value associated with a respective one of the applications, wherein at least one of the resource reallocation requests includes one or more of the following:
    a priority value lifetime indicator that indicates how long the priority value in the resource reallocation request is to apply for a network socket that has been assigned to the respective application, and
    a content amount indicator that indicates a maximum amount of content, transmitted to the network socket, for which the priority value is to apply; and
  reallocating the network resources for delivery of the content to the applications based on the respective priority values and to the network sockets identified by the respective network socket identifiers in the resource reallocation requests, wherein:
    for the resource allocation requests including the priority value lifetime indicator, the reallocation based on the priority value is performed only for the length of time indicated by the priority value lifetime indicator; and
    for the resource allocation requests including the content amount indicator, the reallocation based on the priority value is performed only until the amount of content transmitted reaches the maximum amount indicated by the content amount indicator.

9. The method of claim 8, wherein:
each priority value indicates a communication bandwidth priority set for the respective application, the communication bandwidth priority providing an indication of a communication bandwidth required for the application relative to the communication bandwidths required for one or more other applications; and
reallocating the network resources comprises distributing a communication bandwidth available at the network node so as to deliver the content to the applications in accordance with the respective communication bandwidth priorities.

10. The method of claim 8, wherein:
each priority value indicates a communication delay priority set for the respective application, the communication delay priority providing an indication of a communication delay required for the application relative to the communication delays required for one or more other applications; and
the network resources are reallocated so as to deliver the content to the applications in accordance with the respective communication delay priorities.

11. The method of claim 8, wherein:
a plurality of the resource reallocation requests are received in a predetermined time interval; and
the network resources are reallocated using one of:
  the highest priority value in the resource reallocation requests received during the predetermined time interval; and
  an average of the priority values in the resource reallocation requests received during the predetermined time interval.

* * * * *